(12) United States Patent
Li et al.

(10) Patent No.: US 9,848,453 B2
(45) Date of Patent: Dec. 19, 2017

(54) METHODS, DEVICES AND COMPUTER PROGRAM PRODUCTS IMPROVING DEVICE-TO-DEVICE COMMUNICATION

(71) Applicant: Avago Technologies General IP (Singapore) Pte. Ltd., Singapore (SG)

(72) Inventors: Zhenhong Li, Shanghai (CN); Haifeng Wang, Shanghai (CN); Kari Rikkinen, Li (FI); Bin Zhou, Shanghai (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/430,811

(22) PCT Filed: Sep. 28, 2012

(86) PCT No.: PCT/CN2012/082396
§ 371 (c)(1),
(2) Date: Mar. 24, 2015

(87) PCT Pub. No.: WO2014/047908
PCT Pub. Date: Apr. 3, 2014

(65) Prior Publication Data
US 2015/0334752 A1 Nov. 19, 2015

(51) Int. Cl.
*H04M 3/00* (2006.01)
*H04W 76/02* (2009.01)
(Continued)

(52) U.S. Cl.
CPC ............ *H04W 76/023* (2013.01); *H04B 1/40* (2013.01); *H04W 72/005* (2013.01);
(Continued)

(58) Field of Classification Search
None
See application file for complete search history.

(56) References Cited

U.S. PATENT DOCUMENTS 9,235,078 B2 * 1/2016 Yu .................... G02F 1/133385
2008/0002658 A1 * 1/2008 Soliman .............. H04W 76/023
370/343

(Continued)

FOREIGN PATENT DOCUMENTS

| CN | 101051967 | 10/2007 |
|----|-----------|---------|
| CN | 101772199 | 7/2010 |

(Continued)

OTHER PUBLICATIONS

Tao Peng et al: "Interference avoidance mechanisms in the hybrid cellular and device-to-device systems," IEEE 20$^{th}$ International Symposium on Personal, Indoor and Mobile Radio Communications (PIMRC 2009) IEEE, Piscataway, NJ, USA, Sep. 13, 2009 (Sep. 13, 2009) pp. 617-621, XP031659660.

(Continued)

*Primary Examiner* — Shantell L Heiber
(74) *Attorney, Agent, or Firm* — Foley & Lardner LLP

(57) ABSTRACT

The present invention proposes methods, devices and computer program products improving device-to-device communication. In order to improve D2D communication, the invention proposes a centralized communication concept involving a centralized control unit and those devices participating at the D2D communication. The concept involves a three-party RTS/CTS exchange.

17 Claims, 11 Drawing Sheets

(51) Int. Cl.
*H04B 1/40* (2015.01)
*H04W 72/00* (2009.01)
*H04W 72/04* (2009.01)
*H04W 74/08* (2009.01)
*H04W 88/06* (2009.01)

(52) U.S. Cl.
CPC ... *H04W 72/0453* (2013.01); *H04W 74/0816* (2013.01); *H04W 88/06* (2013.01)

(56) References Cited

U.S. PATENT DOCUMENTS

| | | | | |
|---|---|---|---|---|
| 2008/0186895 | A1* | 8/2008 | Shang | H04L 29/06 370/312 |
| 2011/0258327 | A1 | 10/2011 | Phan et al. | |
| 2011/0317569 | A1* | 12/2011 | Kneckt | H04W 74/0833 370/252 |
| 2013/0005377 | A1* | 1/2013 | Wang | H04W 72/0406 455/509 |
| 2013/0064138 | A1* | 3/2013 | Hakola | H04L 67/16 370/255 |
| 2013/0083684 | A1* | 4/2013 | Yeh | H04W 8/26 370/252 |
| 2013/0150051 | A1* | 6/2013 | Van Phan | H04W 12/04 455/437 |
| 2013/0231151 | A1* | 9/2013 | Kneckt | H04W 40/246 455/515 |
| 2014/0219261 | A1* | 8/2014 | Johnsson | H04W 76/023 370/338 |
| 2015/0094064 | A1* | 4/2015 | Lei | H04W 76/023 455/436 |

FOREIGN PATENT DOCUMENTS

CN 102647246 8/2012
WO WO/2011/109941 9/2011

OTHER PUBLICATIONS

Extended European Search Report for EP 74735 dated Aug. 24, 2016.
International Search Report for PCT/CN2012/082396 dated Jun. 13, 2013.
Written Opinion for PCT/CN2012/082396 dated Jun. 13, 2013.
International Preliminary Report on Patentability for PCT/CN2012/082396 dated Mar. 31, 2015.

* cited by examiner

The source D2D device

The destination D2D device

METHODS, DEVICES AND COMPUTER PROGRAM PRODUCTS IMPROVING DEVICE-TO-DEVICE COMMUNICATION

RELATED APPLICATIONS

This application is the U.S. National Stage of International Application Number PCT/CN2012/082396, filed Sep. 28, 2012, the entire contents of which are hereby incorporated herein by reference for all purposes.

FIELD OF THE INVENTION

The present invention relates to devices, methods and computer program products in relation to device-to-device communication. In particular, it relates to those devices, methods and computer program products for device-to-device communication in, for example, a so-called unlicensed band.

BACKGROUND

Mobile communication architectures can be categorized as cellular networks and ad-hoc networks. In a cellular network, direct communication between mobile devices is usually not permitted. Traffic is generally routed via one or more core network elements even if the source and destination are close to each other. Contrary, in ad-hoc networks, mobile devices can communicate directly with each other without involving a (core) network infrastructure such as a centralized controller. This is referred to as device-to-device (D2D) or peer-to-peer (P2P) communication.

Enabling additional D2D communications in cellular networks was found to potentially become a promising concept. According to such concept, local D2D communication benefits from the centralized controlling of cellular system such as resource allocation and interference coordination. Also, the efficiency of a cellular system can be improved by exploiting channels of high quality for short-range D2D links.

Advantages of introducing D2D communication into a cellular system may, for example, include: longer battery life of mobile device's batteries due to reduced transmission power requirements, more efficient resource usage because of direct routing of D2D traffic, improved performance of content distribution applications by using inter-recipient transmissions, etc.

D2D communication as an underlay to the cellular networks has been proposed to be a key technology component for the International Mobile Telecommunications-Advanced (IMT-Advanced) networks. In this report, D2D communications using Long Term Evolution (LTE) standard technology for the enhancement of cellular system is referred to as LTE D2D.

Generally, the invention pertains to centralized wireless networking combined with an additional ability of D2D communication. Devices such as mobile devices can communicate via a centralized station, such as a centralized control unit or the like, at least partially routing the communication between two or more devices. The centralized control unit may be part of the core network infrastructure. Especially, the centralized station is usually aware of those devices which are in a communication range with the centralized station. The devices need not be mobile. They can also be stationary. They may be user equipments such as cellular phones, smart phones, laptop's, or the like. Although wireless communication is usually established via radio as a transmission resource, it may also be applied to ultrasonic, infrared light or the like as transmission resource. The transmission resource may be limited to a certain band or divided in certain bands, wherein a band defines a wavelength range or a frequency range, respectively.

Herein below, however, exemplary aspects of the invention will be described with reference to radio communication as wireless communication.

A certain application may provide for a D2D communication feature sharing the same band of a transmission resource with other communication applications such as Industrial, Scientific and Medical (ISM) appliances as e.g. WLAN, Bluetooth™, ZigBee™, or the like. ISM applications often do not require a license for operation which is why such bands may also be referred to as unlicensed bands or license exempt bands. In contrast hereto, communication via networks commonly require an agreement (for license) on which bands are to be used/reserved. This is why it may also be referred to as licensed bands. In many cases, the D2D communication as well as communication of ISM appliances can be locally limited. Therefore, interference may inter alia appear when the communication ranges of the D2D communication and the communication of ISM appliances spatially and temporally overlap. Such shared bands require specific conditions so that interferences between the communications can be avoided to some extent. For this purpose, it is known in the art to use certain handshaking procedures such as, e. g. in relation to WLAN, Carrier Sense Multiple Access/Collision Avoidance CSMA/CA in order to reduce interference.

Irrespective thereof, some communication interference may arise during different communications in a shared band although using CSMA/CA. The problem envisaged is supposed to be further detailed on the basis of a specific situation in which centralized wireless network-based communication is provided by LTE technology in combination with D2D communication in the same band as free local communication, which band can be an ISM band. The following discussion is not to be understood to limit the scope of the invention but to improve the ease of understanding only.

It is envisioned that LTE technology usage on shared bands can provide: 1) new markets to LTE technology based radio systems; 2) additional capacity to cellular system operation; 3) new applications and communication solutions using LTE modem technology such as wireless machine-to-machine (M2M) and D2D communications. Therefore, although most recent research works assume that LTE D2D should be operated on the licensed bands to guarantee a controlled interference environment, the benefits of using license exempt bands (also referred to as unlicensed bands), such as the 2.4 GHz (ISM) band, to perform LTE D2D communication have not been sufficiently taken into account.

In a D2D communication underlying cellular concept, such as LTE D2D, D2D communication can be established via three successive stages:

1) the gateway detects and earmarks any potential D2D traffic by checking source and destination IP addresses;

2) a D2D radio bearer for each D2D communicating pair is set up with the help of MME and eNB; and 3) the eNB allocates a resource for each D2D communicating pair.

The stage 3 of this concept can also be regarded as a D2D communication setup. In this concept, the D2D communications are using licensed resource of cellular system so that the eNB can directly allocate resource for the D2D pair.

In order to facilitate LTE D2D operating e. g. on ISM band, the main challenges are related to a co-existance of LTE D2D and the popular IEEE 802.11 standard related to WLAN in the same frequency band and geographical area.

Some studies tried to achieve a fair resource contention for both LTE D2D and e. g. WLAN, Bluetooth™, ZigBee™ by using for example CSMA/CA mechanism such as e. g. specified in IEEE 802.11 DCF. The basic idea is that, by the exchange of request to send/clear to send (RTS/CTS) messages, D2D devices can silence WLAN terminals within their signal coverage and thus use the resource on an ISM band without severe interference.

WLAN terminals being out of the signal coverage of D2D devices communicating are not aware of an ongoing D2D communication between those devices. In this case, if a centralized control unit such as a home evolved node_B (HeNB) wants to regulate the D2D communication between the D2D devices, the control signaling and/or D2D status report may be interfered by such nearby WLAN terminals.

The co-existence problem as outlined above between a LTE D2D and a WLAN system of the present example and based on a conventional resource contention scheme using CSMA/CA mechanism is shown in FIG. 1.

FIG. 1 schematically depicts exemplary a situation of a LTE D2D communication contending with a WLAN operation. As a centralized control unit, a HeNB triggers the D2D communication between two user equipments UE1 and UE2. The HeNB, the user equipments UE1 and UE2 are assumed to be in an overlapping area of two communication ranges 70, 72 of the user equipments UE1 and UE2 as well. In this scenario, the user equipment UE1 is to transmit data to the user equipment UE2. Therefore, user equipment UE1 starts establishing D2D communication by broadcasting a certain request signal, namely, a RTS (request to send) signal. The user equipment UE2 receives this RTS signal and responds by broadcasting a CTS (clear to send) signal. The user equipment UE1 receives the CTS signal and starts to transmit the data.

FIG. 1 shows a certain area designated as RTS-coverage. This area is the communication range 70 of the user equipment UE1. Moreover, FIG. 1 shows a further area designated as CTS-coverage. This area is the communication range 72 of the user equipment UE2. As can be seen from FIG. 1, communication ranges 70, 72 overlap. In the overlapping portion of the communication ranges 70, 72, the user equipments UE1 and UE2 are located.

Additionally, WLAN terminals W1 through W4 are shown. The WLAN terminals W1 and W2 are outside of any of the communication ranges 70, 72. However, the WLAN terminals W1 and the W2 are located close to the HeNB. The WLAN terminal W3 is located in the communication range 70 of the user equipment UE1. The WLAN terminal W4 is located in the communication range of the user equipment UE2. The operation can be as follows:

As a source D2D device, the user equipment UE1, willing to transmit a data packet to the user equipment UE2 as a destination D2D device, first senses the medium. In this scenario, the medium is instantly the ISM radio band 2.4 GHz which is often used for WLAN services.

The term "medium" corresponds to a first resource as will become apparent later. If the medium is busy then it defers. If the medium is free for a specified time such as a Distributed Inter Frame Space (DIFS) according to the IEEE 802.11 standard, then the user equipment UE1 is allowed to transmit a short control packet called Request to Send (RTS) signal which includes a source address, a destination address, and a duration of the following D2D communication.

In response to receipt of the RTS signal, the user equipment UE2 responds, if the medium is free, with a response control packet called Clear to Send (CTS) signal which includes the same duration information as the RTS signal.

All the WLAN stations receiving either the RTS signal and/or the CTS signal such as e.g. the WLAN stations W3 and W4 in FIG. 1, keep silent for the given duration in the RTS signal or the CTS signal. By this means, the medium is reserved for the D2D communication between the user equipment UE1 and the user equipment UE2 without inter-system interference.

This mechanism can protect the transmitter area (RTS coverage indicated by reference character 70 in FIG. 1) and the receiver area (CTS coverage indicated by reference character 72 in FIG. 1) from collisions during D2D communication duration. However, it can not protect the signaling interactions between the HeNB and the D2D communicating user equipment pair UE1, UE2.

WLAN terminals being close to the HeNB but out of the signal coverage of the RTS signal and the CTS signal such as the WLAN terminals W1 and W2 in FIG. 1 are not aware of the ongoing D2D communication. So, interference can appear by the WLAN terminals W1 and/or W2 communicating although D2D communication between the user equipment UE1 and the user equipment UE2 is established.

It should be noted that LTE D2D communication are always performed under the control of the HeNB, for the purposes of resource scheduling, session setup, security, QoS, charging, policy enforcement and etc. The signaling interactions between a HeNB and a D2D communicating pair, such as a D2D status report and resource/power control packet, should be protected from inter-system interference. The existing scenarios can not overcome this problem.

Hence, it is an object of the invention to further improve such scenarios.

SUMMARY

According to a first (apparatus related) aspect of the present invention, there are provided devices at least according to independent claims 1, 6 and 11.

According to a second (method related) aspect of the present invention, there are provided methods at least according to independent claims 16, 21 and 26.

Advantageous further developments are set out in respective dependent claims.

According to a third aspect of the present invention, there are provided one or more computer program product(s) comprising computer-executable components which, when the program is run on a computer, are configured to carry out the respective method(s) as referred herein above.

The above computer program product may further comprise computer-executable components which, when the program is run on a computer, perform the method aspects mentioned above in connection with the method aspects.

The above computer program product/products may be embodied as a computer-readable storage medium.

Various further aspects of at least some exemplary embodiments of the aspects of the invention are set out in the respective dependent claims.

According to an aspect, the central control unit initiates a D2D communication between at least two devices requested to communicate via D2D communication with each other.

As an additional aspect of the invention D2D, the inventive concept can be adapted to allow D2D communication between one source device and one or more destination devices. Moreover, the inventive concept can be adapted to allow D2D communication between one or more source devices and one destination device.

A further aspect involves that a device is adapted to communicate with other devices in a mode as a source device (source mode) as well as in a mode as a destination device (destination mode). According to an additional aspect, the device is adapted to operate in both modes, namely, the source mode and in the destination mode. Moreover, the mode of operation of the device in the source mode or in the destination mode is controlled by the central control unit and/or commands received during D2D communication.

Devices involved in a certain D2D communication may swap from the source mode to the destination mode and vice versa as required.

According to a further aspect, the invention provides for expanding the LTE D2D application area to cover operation in e. g. the ISM band. Modifications can be made to the LTE system to make it aware of other simultaneous usage, e.g. WLAN, Bluetooth™, ZigBee™ or the like of the spectrum.

Especially, a centralized control device or unit, respectively, such as an evolved node_B (eNB) or a home evolved node_B (HeNB) can be involved in such a mechanism for resource contention.

According to an exemplary aspect, a novel scheme referred to as centralized three-party RTS/CTS exchange is proposed by aspects of the invention which facilitates the D2D communications such as the LTE D2D communications fairly contending for the resource on an ISM band with further use such as the most widely deployed WLAN system. The three-party RTS/CTS exchange includes three parties, namely, the centralized control device, and two D2D devices. The centralized control device initiates the three-party RTS/CTS exchange in order to allow D2D communication between the two D2D devices. Three devices or units, respectively, are involved although D2D communication is provided between the two D2D devices only. However, the invention is not limited to the LTE but can generally also be applied to similar communication environments such as licensed/unlicensed bands, e. g. UMTS, GSM or the like with e. g. ISM bands or other unlicensed bands.

Hence, as derivable from the above, a distributed way to improve the resource efficiency is proposed. This proposed way has, at least according to exemplary aspects, the following advantages:

By extending a conventional RTS/CTS handshaking to the three-party RTS/CTS exchange, the D2D communication is performed under the control of a HeNB as a central control device without potential interfering sources.

Generally, involving of the centralized control device in a D2D communication allows enhancing the coverage area of the D2D signaling. Consequently, further not participating devices located in the enhanced coverage area can be reached so that these devices can defer their communication in order to reduce interference to D2D communication. Preferably, the centralized control device controls signaling of the D2D communication by, for instance, triggering the D2D communication. The centralized control device can affect triggering by broadcasting a request signal. Although D2D communication may be provided between at least two D2D devices such as the three-party RTS/CTS exchange, there may be more than two D2D devices involved in the D2D communication, resulting in plural-party RTS/CTS exchange. Likewise, in the plural-party RTS/CTS exchange, communication may be initiated by the centralized control device. The three-party RTS/CTS exchange or plural-party RTS/CTS exchange, respectively, can be started by the centralized control device broadcasting the request signal.

In the proposed three-party RTS/CTS exchange, all the participating nodes do not have to confirm each other. The proposed mechanism can ensure that:

If there are sources such as WLAN interfering sources in any of signal converges of the HeNB, the source and the destination D2D devices, the D2D communication will not start.

If any of the request signal such as the RTS packet, the responses such as the CTS1 and the CTS2 signal are not successfully received by both of the other two recipients, the D2D communication will not start.

All the activities related to contending for the resource are triggered and then controlled by the HeNB, which ensures that there is no intra-HeNB resource contention or collision among multiple D2D communicating pairs.

The duration of the D2D communication can be determined by the HeNB via the request signal such as a RTS packet.

The D2D resource request and grant procedure may be similar to the LTE system.

The D2D devices may not have to broadcast their addresses periodically (as nodes in ad-hoc networks) for the purpose of D2D neighbor discovery.

Preferably, the central control device triggers the D2D communication e. g. by broadcasting the request signal. The request signal defines the participants of the D2D communication, e. g. a source device and a destination device, which may be user equipments. After having received the request signal, a device designated as a source device may start the D2D communication e. g. by broadcasting the data upon additional receipt of a response of the destination device. A user equipment designated as the destination device prepares to start the D2D communication in response to having broadcast its response, e. g. by activating its transceiver for reception of data broadcast from the source device. Broadcasting the response may be released by reception of the request signal.

It should especially be noted that all functionality of the apparatuses may also be configured to operate in a source mode and a destination mode as well. So, an apparatus according to the invention can provide functionalities for both of the respective modes, namely, the source mode and the destination mode. Consequently, methods and computer program products can provide for both operations, namely, the operation as source as well as the operation as destination. Various embodiments for apparatuses, methods, and computer program products can be achieved.

Moreover, the invention is not bound to unlicensed bands. It may also be applied to other wireless resources such as e. g. licensed bands or portions thereof, where D2D communication is allowed.

The inventive concept allows reducing interference of D2D communication in a communication band affected by other appliances sharing this band.

BRIEF DESCRIPTION OF THE DRAWINGS

The teachings of the present invention can be readily understood and at least some additional specific details will appear by considering the following detailed description of at least some exemplary embodiments in conjunction with the accompanying drawings, in which.

DETAILED DESCRIPTION OF EXEMPLARY EMBODIMENTS

Figure 1:
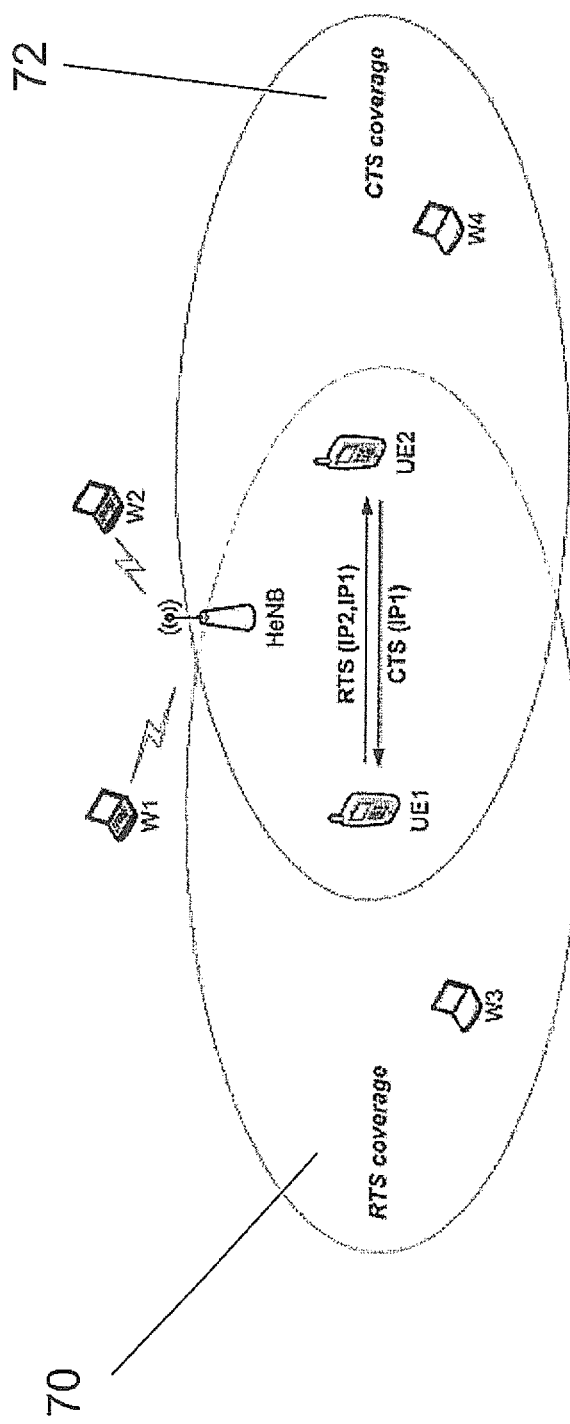
FIG. 1 shows schematically a scenario of a communication environment of LTE D2D communication contending with WLAN operation.

Without limiting the scope of the invention to the embodiments, the invention is illustrated in more detail by the following description referring to the accompanying drawings.

References to certain standards, media and/or resources in this description are rather supposed to be exemplary for the purpose of illustration of the invention in order to improve the ease of understanding of the invention. They are not to be understood as limiting the inventive concept. Likewise, the language as well as terms used herein such as e. g., signal names, device names and the like, are to demonstrate the embodiments only. External use of such language or terms shall not be applied to the invention for the purpose of limiting its scope.

According to one aspect of at least an exemplary embodiment of the invention, D2D communication uses an unlicensed resource such as e. g. an ISM band. In this regard, the D2D communication competes for the resource with, for instance, WLAN communication, which may also be deployed on the same ISM band.

Referring to the above stage 3 related to D2D communication, setup according to the above stage 3 is replaced by a three-party RTS/CTS exchange or plural-party RTS/CTS exchange. The three-party RTS/CTS exchange or plural-party RTS/CTS exchange may be triggered by a central control unit, such as an eNB or the like, in order to establish D2D communication between one or more source devices operating in a source mode, on the one hand, and one or more destination devices operating in a destination mode, on the other hand. The devices may be requested to change their mode of operation during a certain D2D communication. In other words, the whole process of the D2D communication setup can likewise be summarized as three successive stages:

1) the gateway detects and earmarks any potential D2D traffic by checking the source and the destination IP addresses;

2) a D2D radio bearer for each D2D communicating pair is set up with the help of the MME and the eNB; and 3) The D2D communicating pair acquires its resource via the three-party RTS/CTS exchange or plural-party RTS/CTS exchange.

According to a further aspect of at least an exemplary embodiment of the invention, a HeNB broadcasts a specific RTS packet as request signal, when the medium (first resource) is free for a DIFS time in the HeNB's judgment in order to trigger e. g. a three-party or plural-party RTS/CTS exchange. The start of a DIFS time can be detected by the HeNB using some energy detection algorithm. The RTS packet contains identities (ID) of the source/destination D2D devices involved in a scheduled D2D communication and a duration allocated to the scheduled D2D communication. Preferably, information in the RTS packet defines at least one first of the D2D devices (e. g. user equipment UE1) to be a source device and at least one second of the D2D devices (e. g. user equipment UE2) to be a destination device. Correspondingly, the first device may operate in a source mode and the second device may operate in a destination mode.

The source D2D device receives the RTS packet. Then, the source D2D device replies with a specific CTS1 packet which contains its own ID, if the medium is free in the judgment of the source D2D device. The duration information in the CTS1 packet should be set in line with the duration information in the RTS packet.

The destination D2D device receives the RTS packet and the CTS1 packet. Then, the destination D2D device replies with a specific CTS2 packet which contains its own ID if the medium is free in the judgment of the destination D2D device. The duration information in the CTS2 packet should be set in line with the duration information in the RTS packet.

The D2D control signaling from the HeNB (or a similar centralized control unit) is triggered conditionally based on the receiving status of the D2D UE's (e. g. user equipments UE1, UE2), meaning that, only if the HeNB successfully receives both, the CTS1 and the CTS2 packets, it starts the control procedures for the D2D communication in question such as power/rate control and the like. The source D2D device starts the data transmission conditionally based on the receiving status of the destination's CTS signal, meaning that only if the source D2D device successfully receives the CTS packet from the destination D2D device, it will start to transmit D2D packets.

Thus, according to at least an example, an aspect of the invention proposes a new scheme of interference reduction for a D2D communication in a band such as an ISM band by other appliances sharing this band, wherein a central control unit is involved in setting up the D2D communication.

Figure 9:
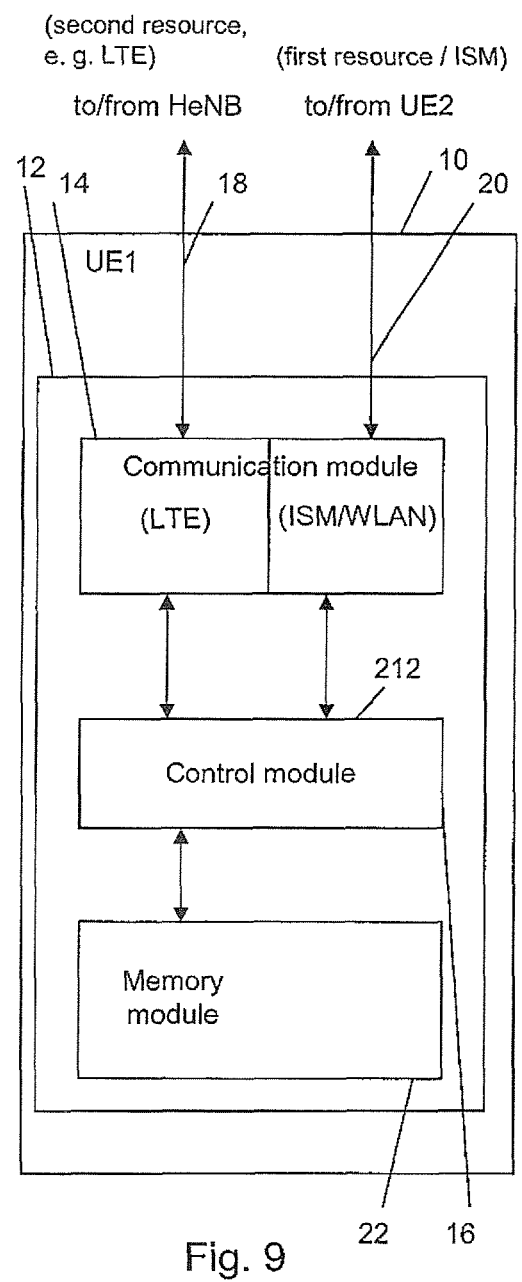
FIG. 9 schematically depicts a block circuit diagram of a first user equipment UE1 containing an apparatus according to at least one aspect of the invention.
Figure 10:
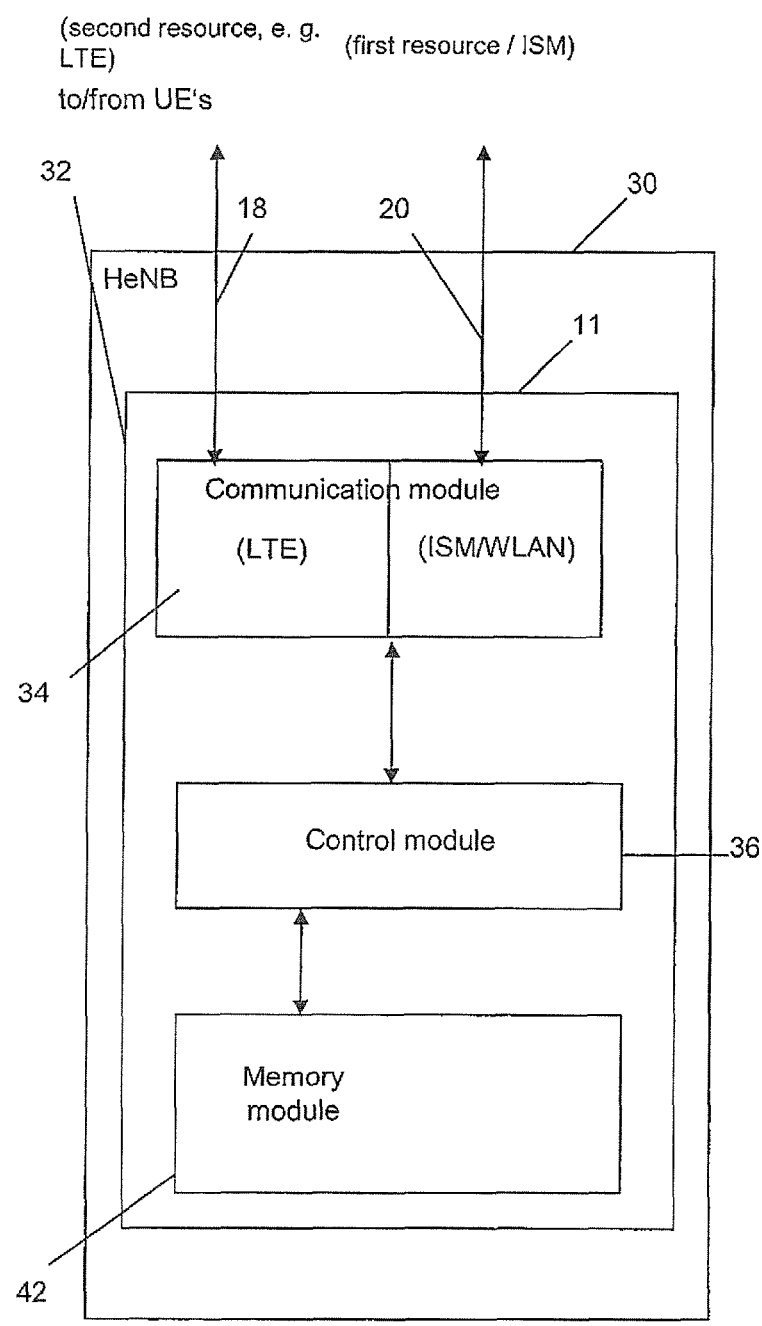
FIG. 10 schematically depicts a block circuit diagram of a centralized control unit such as an eNB or a HeNB according to at least one aspect of the invention.
Figure 11:
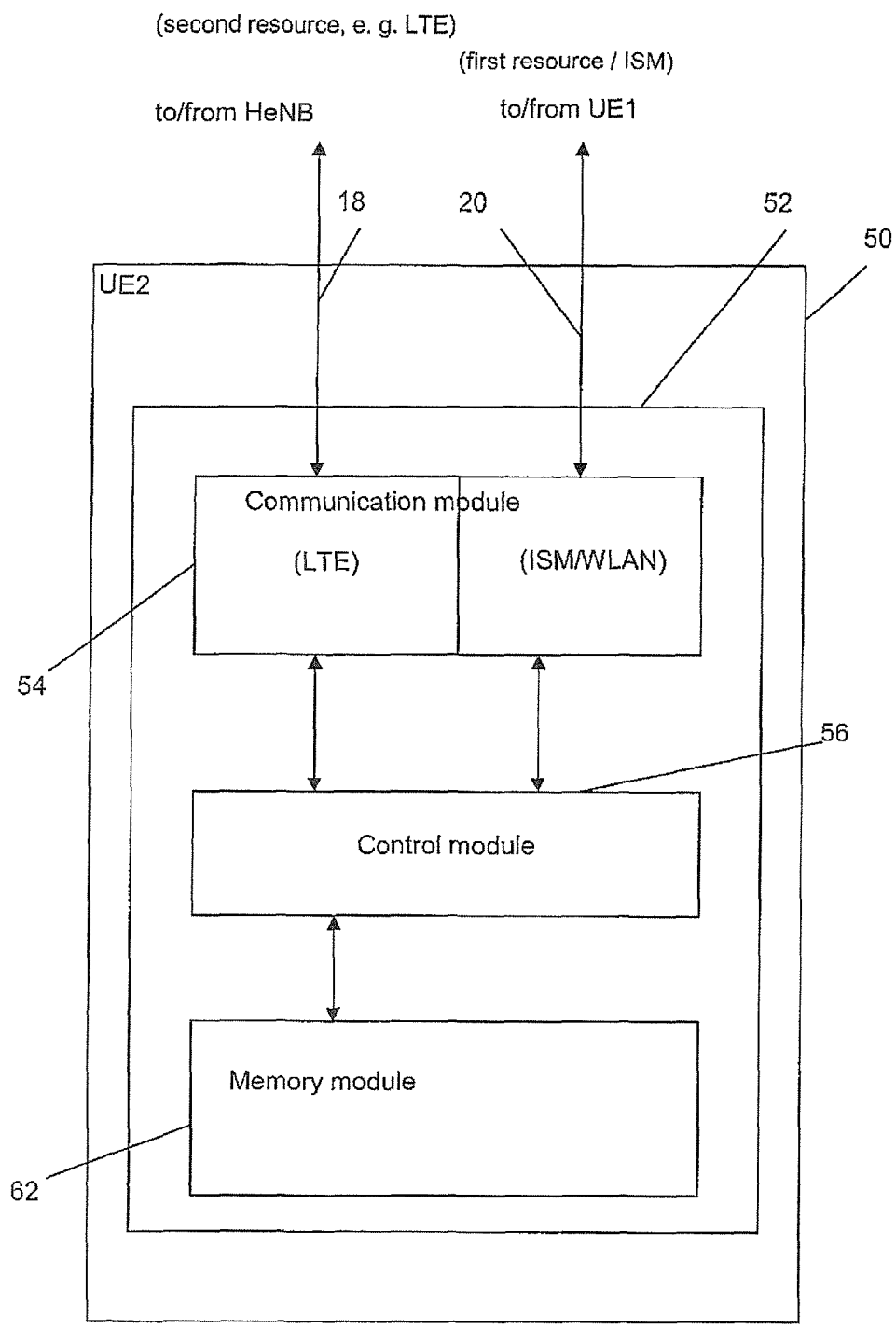
FIG. 11 schematically depicts a block circuit diagram of a second user equipment UE2 containing an apparatus according to at least one aspect of the invention.

FIGS. 9 through 11 show block circuit diagrams of devices suitable for use in relation to at least one exemplary embodiment of the invention.

FIG. 10 shows a block circuit diagram of a HeNB 30 as a centralized control unit being provided with an apparatus 32. The apparatus 32 comprises a control module 36 being configured to control a transceiver 34 which is enabled to communicate using the at least two specific transmission resources 18, 20, wherein a first of said resources 20 is useable for a device-to-device communication. The second resource 18 may be used for centralized networking. Both of the resources are provided for wireless communication.

In an embodiment, the first resource 20 is a radio based resource, especially, e. g. an ISM band, preferably, the 2.4 GHz band as useable for WLAN services or the like. However, the first source may also differ herefrom, e. g. by infrared light, ultrasonic, or the like, wherein the invention can similarly applied. The second resource 18 may be a licensed radio band such as LTE, UMTS, GSM or the like. However, it may also be a differing resource such as infrared light, ultrasonic, or the like.

For the purpose of controlling the transceiver 34, various modules can be provided in the control module 36 such as a processor receiving data from and transmitting data to the transceiver 34, e. g. via a communication link between the transceiver 34 and the control module 36. The transceiver 34 can be realized by a receiver combined with a transmitter suited for radio communication (or generally wireless). Both components may also be integral with each other. The transceiver 34 can include one or more antennas. However, if the communication between the devices is not radio based, the transmitter may be adapted to communicate via a different medium such as infrared light, ultrasonic, or the like. Signals received by the transceiver 34 are submitted to the control module 36. Likewise, signals to be transmitted or broadcast are submitted from the control module 36 to the transceiver 34. The transceiver 34 may be integral with the apparatus 32 as shown in FIG. 10 but it may also be located in the device 30 externally of apparatus 32 and thus need not form part of the apparatus 42. However, if the communication between the devices is not radio based, the transmitter may be adapted to communicate via a different medium such as infrared light, ultrasonic, or the like.

The control module 36 is configured to cause the transceiver 34 to broadcast a request signal RTS containing a first and a second identity ID1, ID2, each identifying a respective device 10, 50 associated to a respective apparatus 12, 52. The request signal RTS requests the devices 10, 50 to communicate with each other via device-to-device D2D communication. The RTS signal may contain information about the conditions related to a scheduled D2D communication.

Preferably, the identities ID1, ID2 may be stored in the HeNB 30, especially in a memory module 42, or they may also be submitted to the HeNB 30 in advance to the D2D communication. If more devices are involved in the scheduled D2D communication, the number of identities in the RTS signal will increase correspondingly.

The control module 36 is also configured to detect a first and a second response CTS1, CTS2 received via the first resource 20. For this purpose, the control module 36 may include or communicate with a detection circuit. The control module 36 can include the detection circuit which is adapted to detect whether a signal received is a CTS signal. The detection circuit can include an adaptable circuitry as well as a computer program running on a processor controlling the circuitry.

The control module 36 is further configured to verify that the first response CTS1 contains the first identity ID1 and that the second response CTS2 contains the second identity ID2. If more devices are involved in the scheduled D2D communication, the number of identities, CTS signals, and verifications will increase correspondingly.

Last but not least, control module 36 is configured to trigger, responsive thereto, the device-to-device D2D communication via the first resource 20 between at least the devices 10, 50 having the first and second identities ID1, ID2. Triggering can be established by broadcasting the RTS signal. But further commands can be provided additionally for triggering.

The apparatus 32 may further comprise the memory module 42 for storing data such as e. g. the first and second identities ID1, ID2. The memory module 42 is connected with the control module 36 via a communication link. The memory module 42 can also be external from the apparatus 32 mentioned before and thus not form part of the apparatus 42.

FIG. 9 shows a block circuit diagram of a first user equipment UE1 such as a device 10 that may be realized as a cellular phone, smartphone or the like. In this embodiment, the UE1 is designated as a source device to transmit data to a second user equipment UE2 as a destination device via D2D communication.

The device 10 includes an apparatus 12 comprising a control module 16 configured to control a transceiver 14 which is enabled to communicate using the at least two specific transmission resources 18, 20. For this purpose various modules can be provided in the control module 16 such as a processor receiving data from and transmitting data to the transceiver 14, e. g. via a communication link between the transceiver 14 and the control module 16. The transceiver 14 can be realized by a receiver combined with a transmitter suited for radio communication (or generally wireless). Both components may also be integral with each other. The transceiver 14 can include one or more antennas. However, if the communication between the devices is not radio based, the transmitter may be adapted to communicate via a different medium such as infrared light, ultrasonic, or the like. Signals received by the transceiver 14 are submitted to the control module 16. Likewise, signals to be transmitted or broadcast are submitted from the control module 16 to the transceiver 14. The transceiver 14 may be integral with the apparatus 12 as shown in FIG. 9 but it may also be located in the device 10 externally of apparatus 12.

Moreover, the control module 16 is configured to detect the request signal, e. g. a RTS signal received via the first resource 20, the request signal RTS triggering initiation of a device-to-device D2D communication. The control module 16 can include a detection circuit which is adapted to detect whether a signal received is a RTS signal. The detection circuit can include an adaptable circuitry as well as a computer program running on a processor controlling the circuitry.

The control module 16 is further configured to verify that the request signal RTS contains the first identity ID1 which identifies the device 10 associated to the apparatus 12. The identity ID1 can be stored in a memory module 22. The memory module 22 can be included by the apparatus 12. However, it also may be included in the device 10 only, i. e. externally from the apparatus 12 and thus not form part of the apparatus 12.

The control module 16 is also configured to cause, in response thereto, the transceiver 14 to broadcast a first response CTS1 containing the first identity ID1. The control module 16 can include a signal generator that generates on request the CTS1 signal. The CTS1 signal is submitted to the transceiver 14 for broadcasting.

The control module 16 is further configured to detect a second response CTS2 received via the first resource 20 and containing a second identity ID2 which identifies another device 50 as user equipment UE2 which will be discussed later on. For this purpose, the control module 16 may use the detection circuit provided to detect the RTS signal. However, a separate detection circuit may be provided which may be similar to the before-mentioned.

The control module 16 is configured to start, responsive thereto, a device-to-device communication via the first resource 20 between the device 10 and a device 50, the device 10 having the first identity ID1 and the device 50 having the second identity ID2 by communicating data.

The apparatus 12 may comprise a memory module 22 as shown in FIG. 9. The memory module 22 can be connected with the control module 16 via a communication link. Preferably, the memory module 22 stores e. g. the first identity ID1. The memory module 22 can also be external from the apparatus 12 and thus not form part of the apparatus 12.

FIG. 11 shows a block circuit diagram of a second user equipment UE2 such as the second device 50 that may be realized as a cellular phone, smartphone or the like. In this embodiment, the user equipment UE2 is designated as a destination device to receive data from the source device 10 via D2D communication. Additionally, the device 50 may be adapted operate not only in the destination mode but also in the source mode.

The device 50 includes an apparatus 52, comprising a control module 56 configured to control a transceiver 54 which is enabled to communicate using the at least two specific transmission resources 18, 20. The transceiver 56 can be similar to the transceiver 14 already described related to the device 10 according to FIG. 9.

The control module 56 is configured to detect a request signal RTS received via the first resource 20, the request signal RTS triggering initiation of a device-to-device D2D communication. Further, the control module 56 is configured to verify that the request signal RTS contains the second identity ID2 which identifies the device 50 associated to the apparatus 52. The apparatus 52 may be realized similar to the apparatus 12.

Moreover, the control module 56 is configured to detect a first response CTS1 received via the first resource 20 and containing the first identity ID1 which identifies the other device 10, and to confirm that the first identity ID1 contained in the first response CTS1 is identical to the first identity ID1 contained in the request signal RTS. For this purpose, the control module 56 may include a confirmation circuitry which itself may be provided by a processor running a certain suited computer program.

The control module 56 is further configured to cause, responsive thereto, the transceiver 54 to broadcast a second response CTS2 containing the second identity ID2, and to prepare to start the device-to-device D2D communication via the first resource 20 between the devices 10, 50 having the first and second identities ID1, ID2. Preferably, preparing can include switching to a receiving mode, in order to receive data from the source device 10 (UE1).

The apparatus 52 may comprise a memory module 62 for storing data such as e. g. the first and second identities ID1, ID2. The memory module 62 can be external from the apparatus 52 and thus not form part of the apparatus 52.

Although the device 50 is described as a destination device, it also may be adapted to be a source device such as the device 10. For this purpose, the device 50 may include additional properties of the device 10 required for the source mode.

The transmitter modules 14, 34, 54 can be configured to establish communication via the first resource 20 and the second resource 18 as well. Different communications via the resources 18, 20 can be simultaneous. It may also be provided that only one of the both resources can be used at time.

An aspect of the invention is the signaling which is further exemplary detailed with reference to FIG. 2. Across an upper portion of FIG. 2, devices are illustrated, namely, the HeNB 30, the source device 10, the destination device 50 and WLAN terminals W1 through W4. In the vertical direction of FIG. 2, lines each allocated to a device indicate a temporal progress.

Figure 2:
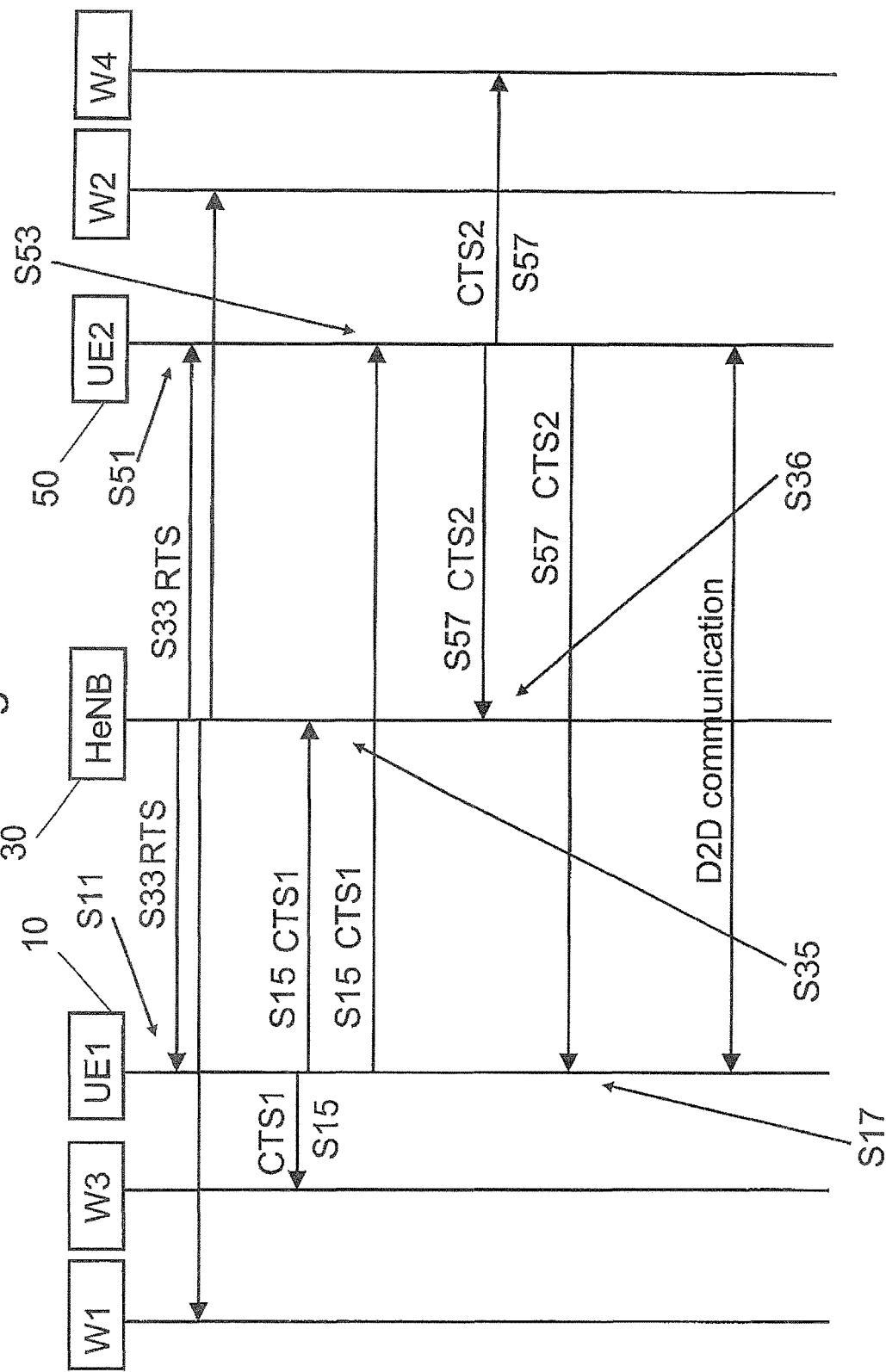
FIG. 2 depicts schematically a signaling for establishing D2D communication according to an exemplary embodiment scenario of the invention.
Figure 6:
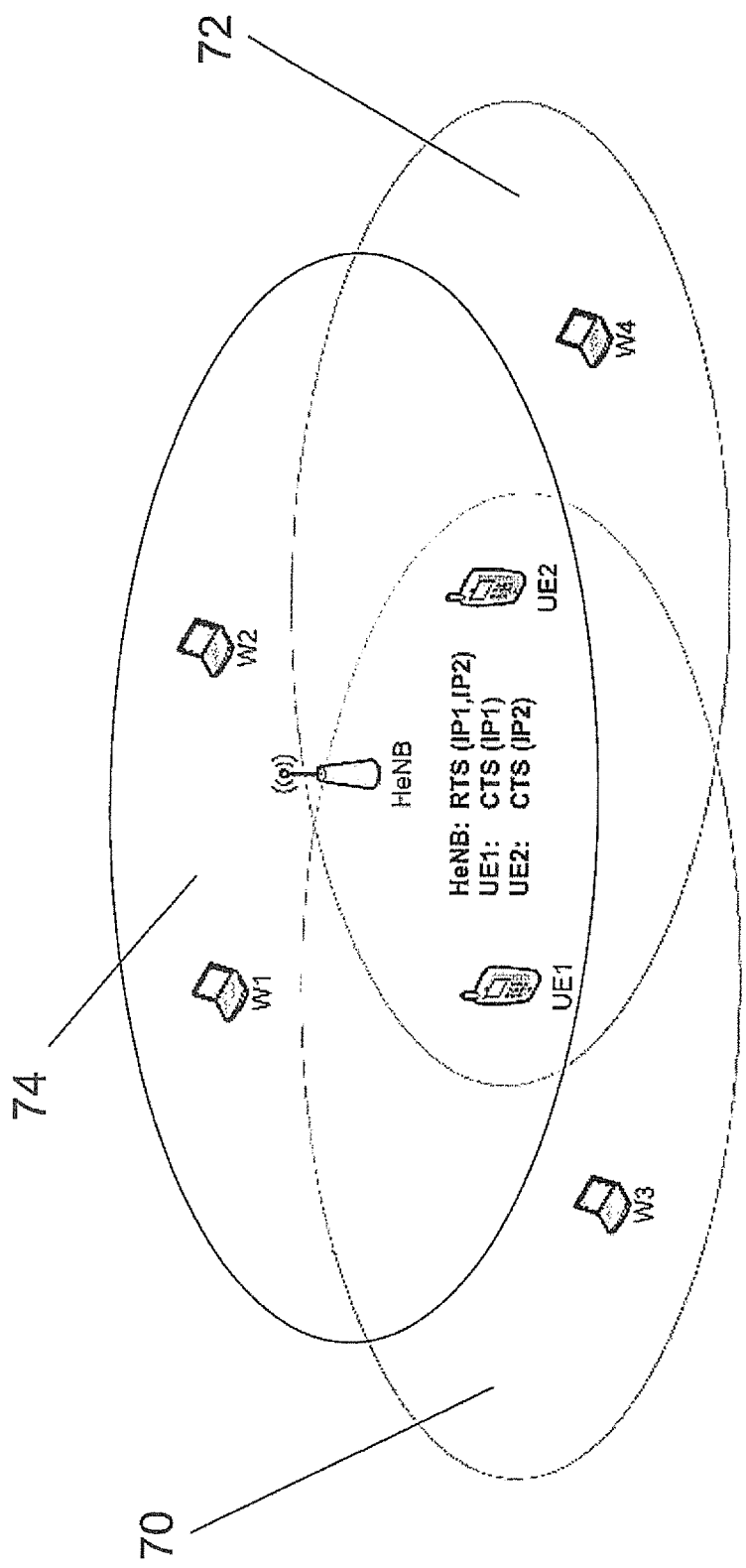
FIG. 6 depicts schematically an exemplary communication environment of LTE D2D communication contending with WLAN operation involving a HeNB as a centralized control device according to an exemplary aspect.

The signaling according to FIG. 2 may be applied to a communication environment such as shown in FIG. 6. As a centralized control unit, HeNB 30 can trigger preparation of the D2D communication by broadcasting a request signal such as the RTS signal comprising the identities of those devices that are to participate in the scheduled D2D communication. In this exemplary embodiment, the D2D communication shares the resource with a WLAN service. The D2D communication is to be provided only between the two devices 10, 50 having respective identities ID1, ID2.

Although in FIG. 2 more than one arrow corresponds to each of the RTS signal, the CTS1 signal and the CTS2 signal, it is to be understood that these signals are preferably only broadcast once. The arrows are supposed to show signal paths only. So, in FIG. 2, for the purpose of presentation, the four arrows related to the RTS signal are regarded to be realized at the same time. The same is to the CTS1 signal and the CTS2 signal. Three arrows are allocated to each of the CTS1 signal and the CTS2 signal showing the signal paths.

Referring now to FIG. 6, showing an embodiment according to the invention. A centralized control unit, such as HeNB 30 shown in FIG. 10, has a communication range 74. Inside of the communication range 74 are located mobile devices 10, 50 as user equipments UE1 and UE2 according to FIGS. 9 and 11. The mobile device 10 has a communication range 70. The mobile device 50 has a communication range 72. The HeNB 30 as well as the mobile devices 10, 50 are located in an overlapping area of all of the three communication ranges 70, 72, 74.

Moreover, four WLAN terminals W1 through W4 are provided according to FIG. 6. The WLAN terminals W1 and W2 are located in the communication range 74 only. The WLAN terminal W3 is located in the communication range 70 only. The WLAN terminal W4 is located in the communication range 72 only.

Considering the arrangement of the HeNB 30, the devices 10, 50 and the WLAN terminals W1 through W4 according to FIG. 6, the RTS signal of the HeNB 30 is received by the device 10 (UE1), the device 50 (UE2) and the WLAN terminals W1 and W2. The WLAN terminals W1 and W2 terminate their communication upon receipt of the RTS signal. Moreover, in response to receipt of the RTS signal, the user equipment UE1 broadcasts a CTS1 signal containing its identity ID1. The CTS1 signal is received by the HeNB 30, the device 50 (UE2) and the WLAN terminal W3. In response, the WLAN terminal W3 terminates its communication. Upon receipt of the CTS1 signal in addition to receipt of the RTS signal by the device 50 (UE2), the device 50 (UE2) broadcasts its CTS2 signal containing its identity ID2. The CTS2 signal is received by the HeNB 30, the device 10 (UE1) and the WLAN terminal W4. In response, the WLAN terminal W4 terminates its communication. Upon device 10 (UE1) having received the CTS2 in addition to the RTS signal, the D2D communication starts by the device 10 (UE1) transmitting data to the device 50 (UE2).

The centralized control unit HeNB 30 is aware of the ID's of the D2D communication participating devices 10, 50 by e. g. previous communication, login procedures or the like. Also, the centralized control unit is informed that a device wants to transmit data to another device in advance of the D2D communication. The centralized control unit first checks whether a D2D communication between the requested devices is possible. If not, the D2D communication is deferred.

As discussed later on, the D2D communication terminates by reaching the end of a duration indicated in the RTS and CTS signals. Although FIG. 6 is directed to a certain embodiment related to the LTE D2D communication in the WLAN ISM band, it should be noted that the inventive concept is not bound thereto. It can be applied to any wireless D2D communication that may be affected by other communication links.

So, the invention can be drawn to an application on the LTE D2D communication, wherein communication is provided in the ISM band where the popular IEEE 802.11 WLAN in the same frequency band and geographical area is operating. In order to facilitate the LTE D2D operating on the ISM band, the main challenges are related to the co-existence of the LTE D2D and the popular IEEE 802.11 WLAN standard in the same frequency band and geographical area such as shown in FIG. 6.

In the concept of the D2D communication as an underlay to a cellular network, the D2D communication should be established with the help of eNB, Mobility Management Entity (MME) and gateway. The gateway is able to detect and earmark any potential D2D traffic by checking the source and destination IP addresses. The MME and eNB then sets up a D2D radio bearer. During the D2D communication, the eNB maintains the local control for the D2D communicating devices and the Society of Automotive Engineers (SAE) bearer between the D2D device and the gateway as well. The resource for D2D communication is allocated by eNB from the unlicensed band for an ISM, especially, a WLAN operation.

The aforementioned D2D underlaying cellular concept is adopted in this embodiment, i.e. the D2D communications operating on the ISM band, except that it is assumed here that the D2D communication is to contend with the WLAN system for the resource on the ISM band. The proposed scheme, referred to as centralized three-party RTS/CTS exchange, is elaborated further as follows by exemplary referring to FIG. 6.

FIG. 6 shows exemplary a communication environment where the invention can be applied to. As can be seen from FIG. 6, the HeNB 30, the user equipments UE1 and UE2 are located in the overlapping area of the communication ranges 70, 72, and 74. So, these three devices can communicate with each other.

In contrast to FIG. 1 showing a similar arrangement of the devices, the HeNB 30 in FIG. 6 is involved in the D2D communication so that the WLAN terminals W1 and W2 become also aware of the D2D communication. This can reduce interferences as denoted before. The process to avoid communication conflicts according to an exemplary aspect of the invention can be as follows.

The user equipments UE1 and UE2 shown in FIG. 6 can be exemplary two LTE devices 10, 50 willing to start a D2D communication under the control of the HeNB 30 which may be a device 30 according to FIG. 10.

Each apparatus 12, 52 of the user equipments UE1 and UE2 has at least a control module 16, 56 configured to provide the necessary functions and a transceiver 14, 54 controlled by the control module 16, 56. The user equipments UE1 and UE2 can be any device, especially, a mobile device such as a cellular phone or the like that has a transceiver enabled for communicating over a licensed band (second resource) as well as an unlicensed band (first resource). The transceiver can be employed for two mode operation. Since the considered D2D communication on the ISM band as unlicensed band can happen in a local area, such as office room and family area, the eNB in the conventional D2D concept is replaced by the HeNB 30 in this scenario. Some WLAN stations denoted as W1, W2, W3 and W4 are located in the same geographic local area, acting as potential interference sources to the D2D communication.

The centralized three-party RTS/CTS exchange in order to contend for resource with the WLAN service starts after the connections between the HeNB and the user equipments UE1 and UE2 as well are successfully set up using Session Initiation Protocol (SIP) and Internet Protocol (IP). Handshaking between the user equipments UE1 and UE2, on the one hand, and the HeNB one the other hand, is provided before the D2D communication between the user equipments UE1 and UE2 is established. Consequently, at this time, the HeNB is already aware of the willingness of the user equipments UE1 and UE2 to communicate via D2D. The HeNB finds the user equipments UE1 and UE2 by their network identities, e.g. Cell Radio Network Temporary Identity (C-RNTI) or IP addresses.

A possible signaling may be based on certain formats for the request signal and the response. In the case of centralized three-party RTS/CTS exchange, said RTS packet has a certain frame format so that all devices in the communication range 74 can detect and recognize this signal. Considering the CSMA/CA protocol, the devices receiving the RTS signal can determine whether they are to participate in the D2D communication or not. Devices that do not participate in the D2D communication, such as the WLAN terminals W1 and W2 in FIG. 6, defer their communication. In this embodiment, the frame format may be used such as in WLAN systems so that the WLAN terminals W1 and W2 within the RTS signal coverage can recognize the RTS signal and then immediately backoff their accesses to the medium. These devices are in FIG. 6 the WLAN terminals W1 and W2. Preferably, communication of the WLAN terminals W1 and W2 is deferred according to a duration value given in the RTS packet and discussed in further detail later on.

Figure 8:
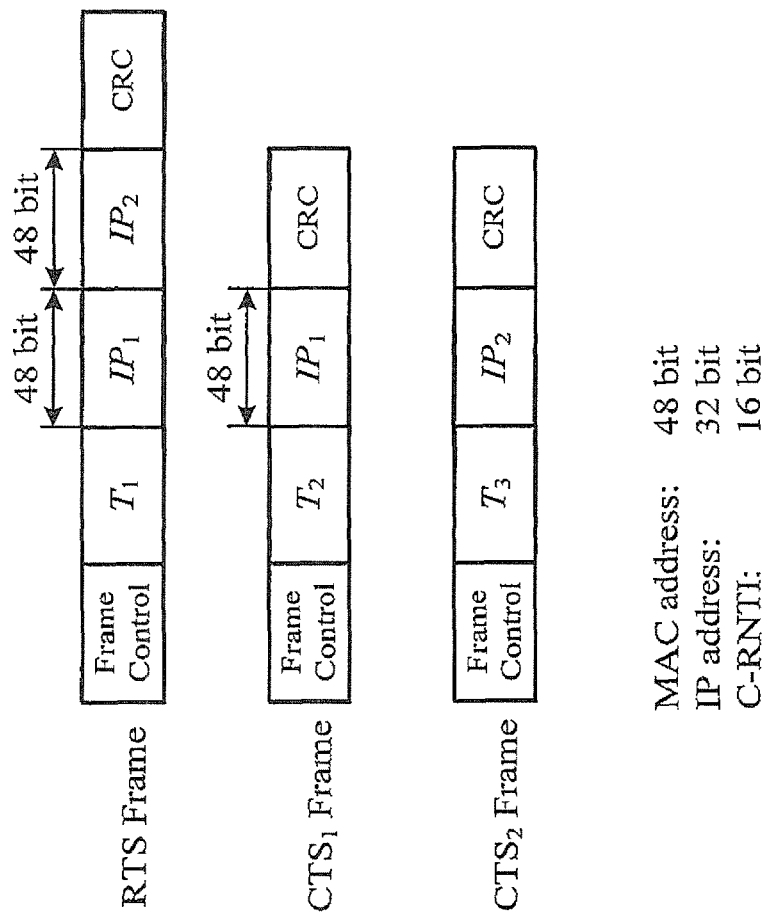
FIG. 8 schematically depicts a frame format for the request signal of the HeNB and the responses of the UE1 and the UE2 according to an exemplary aspect.

Referring to FIG. 8, the format of the RTS signal can be as follows:

The RTS signal contains at least a Receiver Address RA field, a Transmitter Address TA field and a Duration field. However, the number of the fields can be increased adapted to the number of participating devices.

The Receiver Address RA field of said RTS packet preferably contains an identity IP1 of a source D2D device UE1 (FIG. 8). Said identity $IP_1$ as ID1 can be a C-RNTI, an IP address or any other unique identification known by the HeNB. The RA field of the RTS packet may be a 48 bit field which is long enough to contain either the C-RNTI (16 bit) or the IP address (32 bit).

The Transmitter Address TA field of said RTS packet preferably contains an identity $IP_2$ as ID2 of a destination D2D device UE2 (FIG. 8). Said identity IP2 can be a C-RNTI, an IP address or any other unique identification known by the HeNB. The TA field of the RTS packet may be a 48 bit field which is long enough to contain either the C-RNTI (16 bit) or the IP address (32 bit).

So, the RTS signal contains a first and a second identity ID1 and ID2 which identify different devices 10, 50, namely the user equipments UE1 and UE2, associated to different apparatuses 12, 52 requested to communicate with each other via device-to-device communication by the RTS signal.

The duration field of said RTS packet is preferably the time allocated for D2D communication between the user equipments UE1 and UE2, plus the time required to transmit two CTS packets, plus three Short Inter Frame Spaces (SIFS) intervals. Said duration value is denoted as T1 in FIG. 7, 8.

It should be noted that here the transmitter of the RTS packet is the HeNB but the receiver/transmitter addresses carried by the RTS packet belong to the other two nodes, which is different from the conventional WLAN RTS/CTS protocol.

More detailed, in this embodiment departing from the WLAN standard, the TA field does not contain the identity of the real transmitter of the RTS signal, since In this embodiment, the HeNB transmits the RTS. Instead, the TA field contains the identity ID2 of the destination terminal UE2 which UE1 as a source terminal is willing to transmit its data to. Although the user equipment UE2 has not transmitted the RTS signal, at the user equipment UE1 site, the RTS signal is regarded as to allocate the source mode to the user equipment UE1 and the destination mode to the user equipment UE2.

This enables the HeNB to take effect of the D2D communication between the user equipments UE1 and UE2 by initiating the D2D communication with the RTS signal. Additionally departing from the WLAN standard, the transmitter of the RTS signal designated by the TA field is allocated to receive data, whereas the RA field designates the transmitter of the data. The use of the TA field and the RA field deviates from the WLAN standard.

Figure 7:
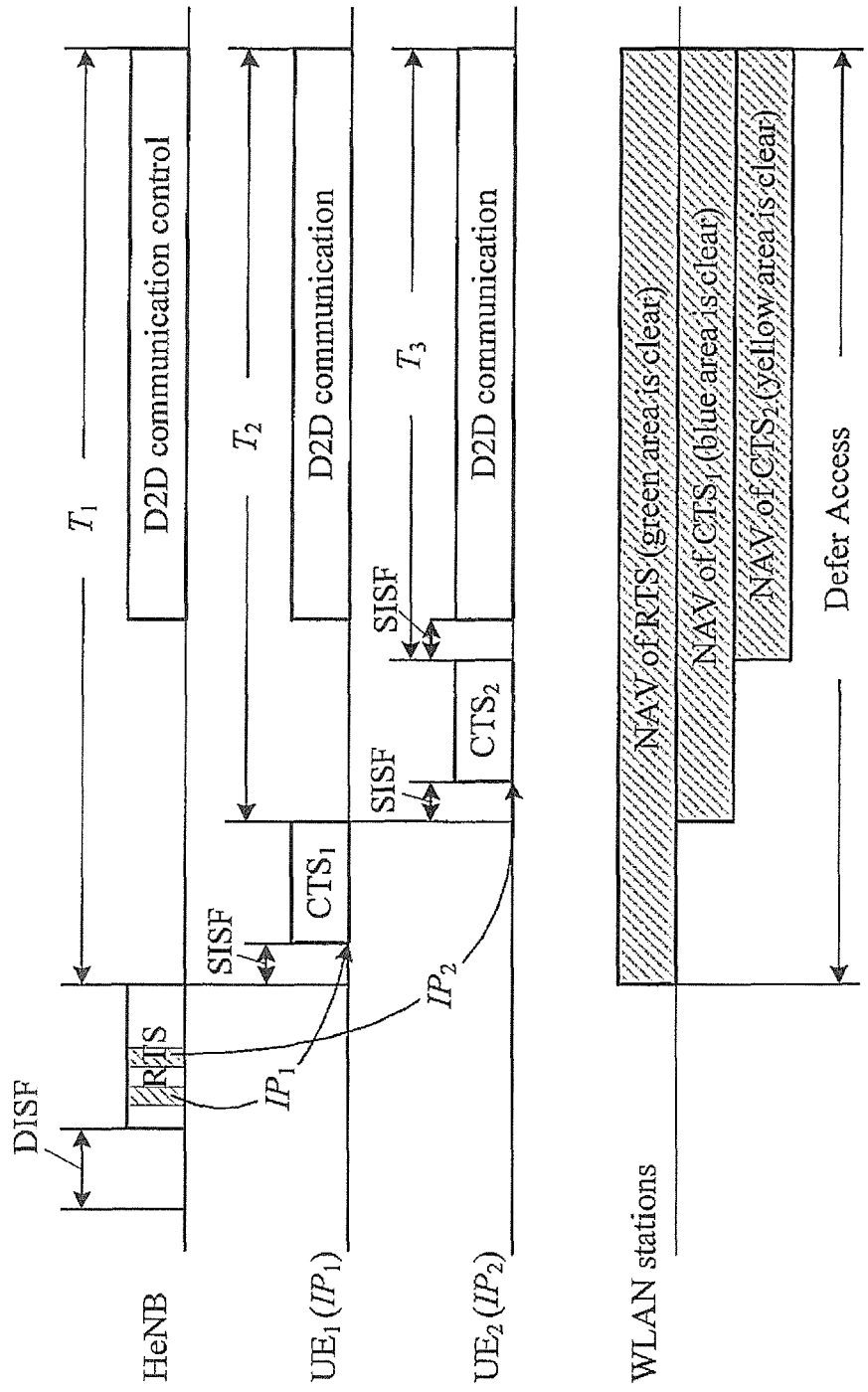
FIG. 7 schematically shows, as an exemplary aspect of an embodiment, a timing diagram for the signal exchange according to the invention.

As shown in FIG. 7, the proposed scheme includes four successive stages.

Figure 4:
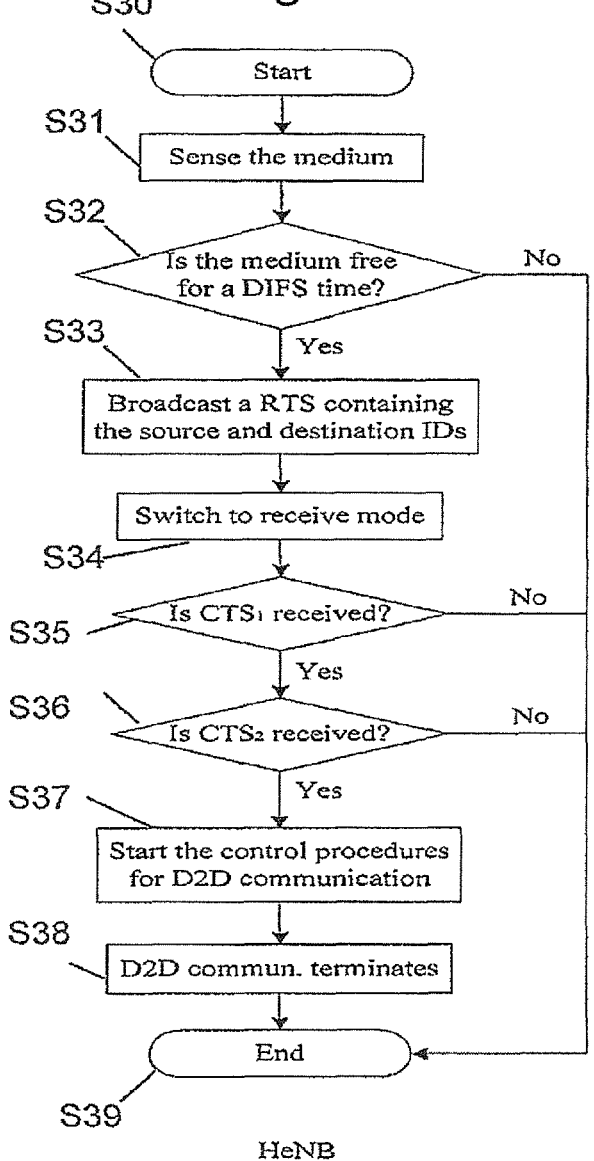
FIG. 4 shows schematically a flow chart illustrating an example of an operation of a HeNB as a centralized control device according to an exemplary aspect.

Stage 1:

An example of the operation of the HeNB 30 is further detailed referring to FIG. 4. The operation is controlled by a control module 36 of an apparatus 32 of the HeNB 30 (FIG. 10). It starts at step S30. It first senses the medium, here e. g. the ISM band as the first resource 20 at step S31. If the medium is busy (S32) then it defers (S39) and the process ends at step S39. If the medium is free for a DIFS time (S32), then HeNB broadcasts (S33) a special RTS packet. The RTS packet is a request signal having beforementioned frame format (FIG. 8). The RTS packet triggers the three-party RTS/CTS exchange that is initiation of a device-to-device communication.

After having transmitted said RTS packet, the HeNB 30 switches back to receive mode at step S34 waiting for the CTS packets from the source and destination D2D devices 10, 50 as the UE1 and the UE2.

Figure 3:
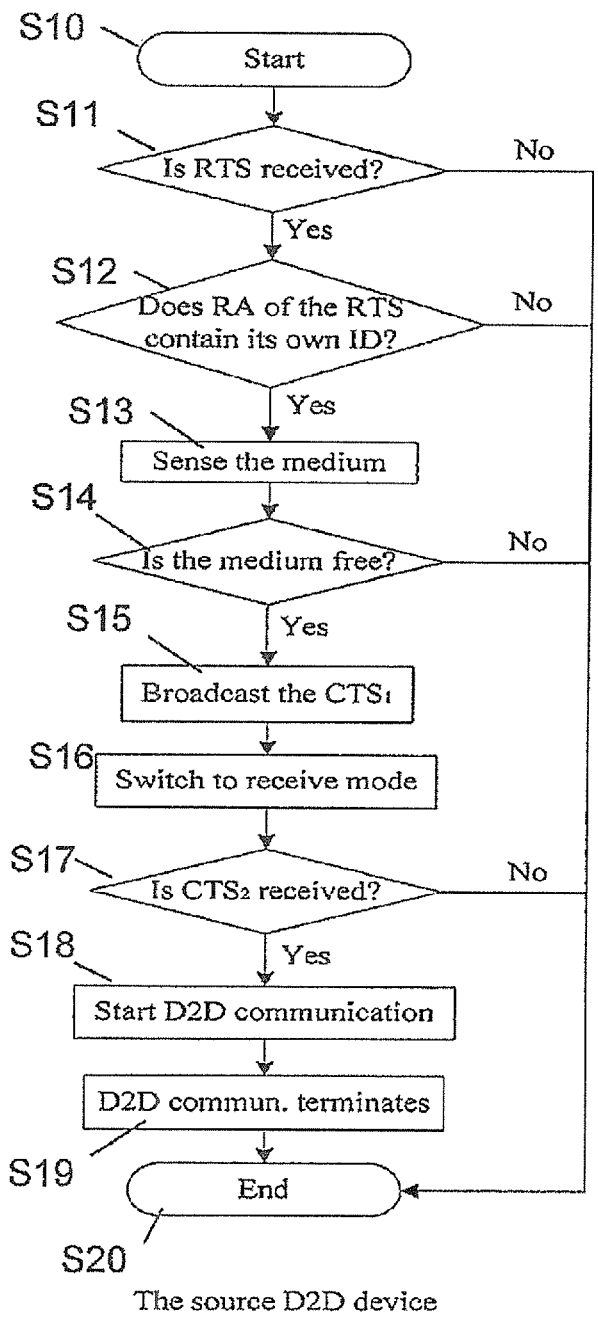
FIG. 3 shows schematically a flow chart illustrating an example of an operation of a first user equipment UE1 as a source terminal according to an exemplary aspect.

Stage 2:

Once a LTE terminal such as the UE1, the UE2, WLAN terminals W1, W2 detects a RTS packet (FIG. 3, step S11) via the ISM band which contains its own identity in the RA field (S12), this terminal understands that it is supposed to participate in the three-party RTS/CTS exchange as a source D2D device, such as the UE1 (FIG. 3, step S10).

The operations are controlled by the control module 16 of the apparatus 12 of the device 10, UE1. The procedure starts at step S10. The UE1 detects whether a RTS packet has been received at step S11. If no RTS packet has been received, the procedure ends at step S20. If a RTS packet has been received, the UE1 verifies that the request signal contains a first identity $IP_1$ which identifies the device 10 associated with the apparatus 12, namely, the UE1 at step S12. If the RTS packet does not contain the first identity $IP_1$, the procedure ends at step S20. If the RTS packet contains the first identity $IP_1$, the source D2D device 10, the UE1, first senses the medium at step S13. If the medium is busy (S14) then it transmits nothing and the procedure ends at step S20. If the medium is free (S13) then the source D2D device 10, the UE1, waits for a SIFS time (S14) and then broadcasts at step S15 a special CTS packet denoted as CTS1 packet in response to the RTS packet received from the HeNB 30.

Said CTS1 packet has a certain frame format as shown in FIG. 8. The frame format of the CTS1 packet is the same as used in WLAN systems (FIG. 8). So, all the WLAN terminals within the CTS1 coverage 70, especially, those being close to the UE1 recognizes the CTS1 packet and then immediately backoff their accesses to the medium, namely the first resource, according to the duration value given in the CTS1 packet. In FIG. 6, the WLAN terminal W3 is affected.

As further illustrated in FIG. 8, a Receiver Address RA field of said CTS1 packet preferably contains the identity $IP_1$ of the source D2D device 10, namely the UE1, itself.

Moreover, the duration field of said CTS1 packet is preferably the time T1 in the RTS packet immediately previous received, minus the time required to transmit one CTS packet, minus one SIFS interval. Said duration value is denoted as T2 in FIGS. 7, 8.

After having transmitted said CTS1 packet, the source D2D device 10, the UE1, switches back to receive mode at step S16 waiting for a CTS2 packet from the destination D2D device 50, the UE2.

Stage 3:

A LTE terminal understands that it is supposed to participate in the three-party RTS/CTS exchange (FIG. 5, starting at S50) as a destination D2D device 50, the UE2, only if the following three conditions are satisfied:

1) The LTE terminal detects a RTS packet (S51) which contains its own identity $IP_2$ in the TA field (S52);

2) The LTE terminal detects a CTS packet (S53) which immediately follows the RTS packet with a SIFS interval;

3) The RA field of the CTS packet contains the same identity as that in the RA field of the RTS packet (S54).

Figure 5:
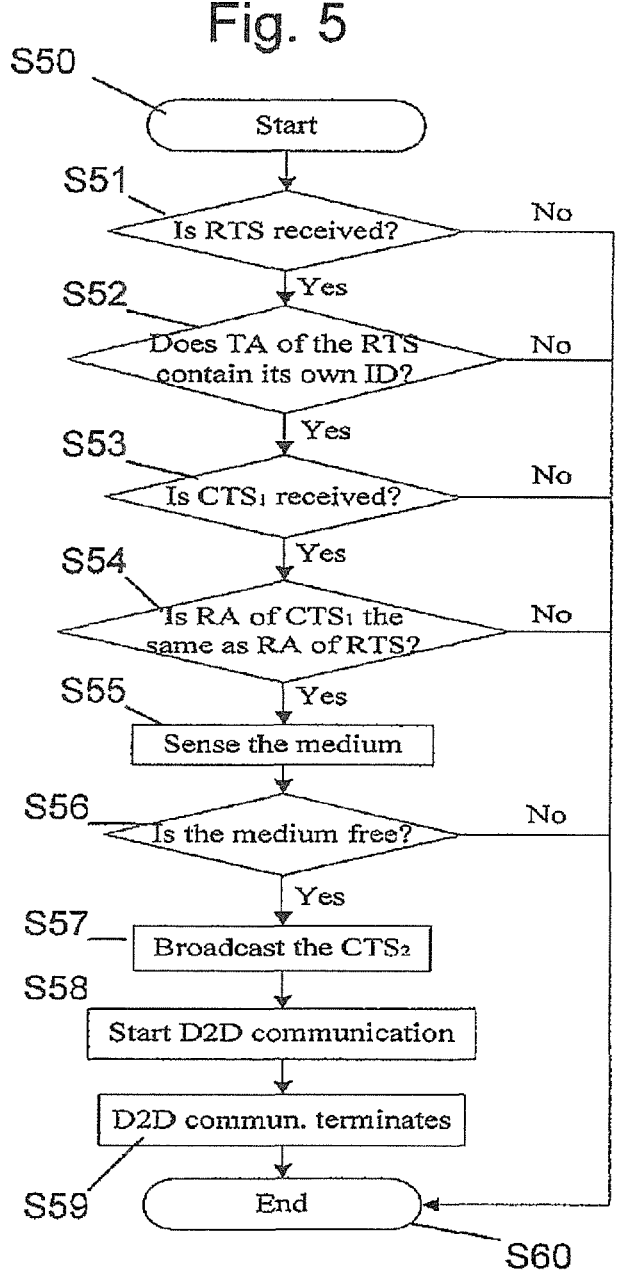
FIG. 5 shows schematically a flow chart illustrating an example of an operation of second user equipment UE2 as a destination terminal according to an exemplary aspect.

FIG. 5 shows exemplary an operation of the UE2 such as the device 50 which is controlled by the control module 56 of the apparatus 52 of the device 50. The procedure starts at step S50. The UE2 detects whether a RTS has been received at step S51. If no RTS packet has been received, the procedure ends at step S60. If a RTS packet has been received, the UE2 verifies that the request signal contains a second identity $IP_2$ which identifies the device 50 associated with the apparatus 52, namely the UE2, at step S52.

The UE2 detects further whether a CTS1 packet has been received at step S53. If no CTS1 packet has been received, the procedure ends at step S60. If a CTS1 packet has been received, the UE2 further determines at step S54 whether a first identity $IP_1$ in the RA field of the CTS1 packet is the same as a first identity $IP_1$ in the RA field of the RTS packet. If no, the procedure ends at step S60. If yes, the destination D2D device 50, the UE2, first senses the medium at step S55.

If the medium is busy (S56), then it transmits nothing and the procedure ends at step S60. If the medium is free (S56), then it broadcasts at step S57 a special CTS packet denoted as CTS2 packet. So, broadcasting of the CTS2 signal is in response to the RTS packet from the HeNB 30 and the CTS1 packet from the UE1.

Said CTS2 packet has the same frame format as those used in WLAN system (FIG. 8). Especially, the CTS2 packet has the same frame format as the CTS1 packet. So, all the WLAN terminals within the CTS2 coverage 72, especially, those being close to the UE2 can recognize the CTS2 packet and then immediately backoff their accesses to the medium, the first resource 20, according to the duration value given in the CTS2 packet. In FIG. 6, the WLAN terminal W4 is affected.

A Receiver Address RA field of said CTS2 packet is proposed to contain the identity $IP_2$ of the destination D2D device 50, namely the UE2 itself.

The duration field of said CTS2 packet is preferably the time in the immediately previous CTS1 packet T2, minus the time required to transmit one CTS packet, minus two SIFS intervals. Said duration value is denoted as T3 in FIGS. 7, 8.

After having broadcast said CTS2 packet, the destination D2D device 50, the UE2, switches back to a receive mode waiting for a D2D packet from the source D2D device 10, the UE1, or the D2D control signaling from the HeNB 30.

Stage 4:

The HeNB 30 proceeds its operation by detecting at step S35 whether a CTS1 packet has been received. If no CTS1 packet has been received, the procedure ends at step S39. If a CTS1 packet has been received, the HeNB proceeds its operation by detecting at step S36 whether a CTS2 packet has been received. If no CTS2 packet has been received, the procedure ends at step S39.

Only when the HeNB 30 successfully receives both, the CTS1 and the CTS2 packets (S35, S36) preferably via the first resource, the ISM band, it starts the control procedures for D2D communication at step S37. Starting depends on verifying that the CTS1 packet contains the first identity $IP_1$ and the CTS2 packet contains the second identity $IP_2$. Responsive thereto, a device-to-device D2D communication via the first resource between the devices UE1 and UE2 having the first and second identities is started. Otherwise, the current attempt to contending for resource fails and the procedure ends at step S39. If another attempt for resource is needed, go back to stage 1.

Only when the source D2D device 10, the UE1, successfully receives or detects, respectively, the CTS2 packet at step S17 via the first resource, the ISM band, it starts to transmit D2D packets at step S18. Transmission is provided via the ISM band as the first resource. Preferably, starting to transmit D2D packets at step S18 depends on the second response containing a second identity $IP_2$ which identifies another device, namely the UE2. Otherwise, the current attempt to contending for resource fails and the procedure ends at step S20. If another attempt is needed, go back to stage 2.

If the destination D2D device 50, the UE2, does not receive either any D2D packets from the source D2D device 10, the UE1, or D2D control signaling from the HeNB 30, it will be aware of the failure of the current attempt to contending for resource fails (S59, S60). If another attempt is needed, go back to Stage 3.

If the duration times of the RTS, the CTS1 and/or the CTS2 are run out, the D2D communication can be terminated at steps S19, S38, S59, respectively.

Other systems can also benefit from the principles presented herein as long as they have identical or similar properties like the D2D communication in any communication band.

Embodiments of the present invention may be implemented in software, hardware, application logic or a combination of software, hardware and application logic. The software, application logic and/or hardware generally reside on control modules of terminal devices or network devices.

In an example embodiment, the application logic, software, or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or a smart phone, a user equipment, or the like.

The present invention can advantageously be implemented in user equipments or smart phones, or personal computers connectable with such networks. That is, it can be implemented as/in chipsets to connected devices, and/or modems thereof. More generally, various systems which allow for a dual mode operation, relying on cellular communication as one mode for a specific transmission resource and a D2D communication as a second mode for a specific transmission resource, may see performance improvement with the invention being implemented thereto.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be regarded as limiting the scope. Rather, there are several variations and modifications which may be made without departing from the scope of the present invention as defined in the appended claims.

LIST OF ACRONYMS

ISM: Industrial, Scientific and Medical band
WLAN: Wireless Local Area Network
RTC/CTS: Request To Send/Clear To Send
NAV: Network Allocation Vector
SIFS: Short Inter Frame Space
DIFS: Distributed Inter Frame Space
LTE: Long Term Evolution
D2D: Device to Device
P2P: Peer-to-Peer
CSMA/CA: Carrier Sense Multiple Access/Collision Avoidance
M2M: Machine-to-Machine
IEEE: Institute of Electrical and Electronics Engineers
eNB: evolved Node_B
HeNB: Home evolved Node_B
QoS: Quality of Service
UE: user equipment
GSM: Global System for Mobile Communications
MME: Mobility Management Entity
SAE: Society of Automotive Engineers
C-RNTI: Cell Radio Network Temporary Identity
SIP: Session Initiation Protocol
IP: Internet Protocol

What is claimed is:
1. An apparatus, comprising:
a control module configured to:

control a transceiver which is enabled to communicate using at least two specific transmission resources, wherein a first of said resources is useable for a device-to-device communication, detect a request signal, received via the first resource, comprising at least a duration indication field which contains a time indication indicative of an initial time for which the first resource is intended to be reserved for at least a device-to-device communication between the devices, the request signal triggering initiation of a device-to-device communication;

verify that the request signal contains a first identity which identifies a device associated to the apparatus, responsive thereto, cause the transceiver to broadcast a first response containing the first identity and a duration indication field, which contains a first time indication indicative of a first time for which the first transmission resource is intended to be reserved for at least a device-to-device communication between the devices, wherein the first time is defined by the initial time minus a guard period time minus a duration of the transmission of the first response, detect a second response received via the first resource and containing a second identity which identifies another device, and responsive thereto, start a device-to-device communication via the first resource between the devices having the first and second identities.

2. The apparatus according to claim 1, wherein
the request signal comprises at least two predetermined address fields, wherein a first predetermined one of those address fields contains the first identity; and wherein
the control module is further configured to
verify that the request signal contains the first identity in the first predetermined address field.

3. The apparatus according to claim 1, wherein
the request signal comprises at least two predetermined address fields, wherein a second predetermined one of those address fields contains the second identity; and wherein
the control module is further configured to
confirm that the second identity contained in the second response is identical to the second identity contained in the request signal.

4. The apparatus according to claim 1, wherein
the control module is further configured to
cause to broadcast the first response after expiry of the guard period time after receipt of the request signal.

5. An apparatus, comprising:
a control module configured to:
control a transceiver which is enabled to communicate using at least two specific transmission resources, wherein a first of said resources is intended for a device-to-device communication,
detect a request signal received via the first resource, the request signal triggering initiation of a device-to-device communication;
verify that the request signal contains a second identity which identifies a device associated to the apparatus,
detect a first response received via the first resource and containing a first identity which identifies another device,
confirm that the first identity contained in the first response is identical to the second identity contained in the request signal,
responsive thereto, cause the transceiver to broadcast a second response containing the second identity, and
prepare to start a device-to-device communication via the first resource between the devices having the first and second identities.

6. The apparatus according to claim 5, wherein
the request signal comprises at least two predetermined address fields, wherein a second predetermined one of those address fields contains the second identity; and wherein
the control module is further configured to
verify that the request signal contains the second identity in the second predetermined address field.

7. The apparatus according to claim 6, wherein
the control module is further configured to
cause to broadcast the second response after expiry of a guard period time after receipt of the first response.

8. The apparatus according to claim 5, wherein
the first response further comprises at least a duration indication field, which contains a time indication indicative of a first time for which the first transmission resource is intended to be reserved for at least device-to-device communication between the devices;
and wherein, the control module is further configured to
compose the second response
comprising the second identity, and
comprising a duration indication field, which contains a second time indication indicative of a second time for which the first transmission resource is intended to be reserved for at least device-to-device communication between the devices, wherein the second time is defined by the first time minus two guard period times minus a duration of the transmission of the second response.

9. The apparatus according to claim 5, wherein
the request signal comprises at least two predetermined address fields, wherein a first predetermined one of those address fields contains the first identity; and wherein
the control module is further configured to
confirm that the first identity contained in the first response is identical to the first identity contained in the request signal.

10. An apparatus, comprising:
a control module configured to:
control a transceiver which is enabled to communicate using at least two specific transmission resources, wherein a first of said resources is intended for a device-to-device communication,
cause the transceiver to broadcast a request signal containing at least a first and a second identity, each identity identifying a respective device associated to a respective apparatus, the request signal requesting the devices to communicate with each other via device-to-device communication, and further containing a duration indication field which contains an initial time indication indicative of an initial time for which the first transmission resource is intended to be reserved for at least device-to-device communication between the devices, wherein the initial time is defined by a time allocated for the device-to-device communication between the devices plus a time for transmitting the responses of the apparatuses requested to communicate via device-to-device communication plus a number of guard period times, wherein the number corresponds to the number of the identities contained in the request signal increased by one, detect a first and a second response received via the first resource, verify that the first response contains the first identity and that the second response contains the second identity, and responsive thereto, trigger a device-to-device communication via the first resource between the devices having the first and second identities.

11. The apparatus according to claim 10, wherein the request signal comprises at least two predetermined address fields, wherein a first predetermined one of those address fields contains the first identity, and wherein a second predetermined one of those address fields contains the second identity.

12. The apparatus according to claim 10, wherein the control module is further configured to cause to broadcast the request signal after expiry of a pause period time in the first of said resources.

13. A method comprising:

controlling a transceiver which is enabled to communicate using at least two specific transmission resources, wherein a first of said resources is useable for a device-to-device communication;

detecting a request signal comprising at least a duration indication field which contains a time indication indicative of an initial time for which the first resource is intended to be reserved for at least a device-to-device communication between the devices, received via the first resource, the request signal triggering initiation of a device-to-device communication;

verifying that the request signal contains a first identity which identifies a device associated to the apparatus;

responsive thereto, causing the transceiver to broadcast a first response containing the first identity and comprising a duration indication field which contains a first time indication indicative of a first time for which the first transmission resource is intended to be reserved for at least a device-to-device communication between the devices, wherein the first time is defined by the initial time minus a guard period time minus a duration of the transmission of the first response;

detecting a second response received via the first resource and containing a second identity which identifies another device; and responsive thereto, starting a device-to-device communication via the first resource between the devices having the first and second identities.

14. The method according to claim 13, wherein the request signal comprises at least two predetermined address fields, wherein a first predetermined one of those address fields contains the first identity; and wherein the method further comprises:

verifying that the request signal contains the first identity in the first predetermined address field.

15. The method according to claim 13, wherein the request signal comprises at least two predetermined address fields, wherein a second predetermined one of those address fields contains the second identity; and wherein the method further comprises:

confirming that the second identity contained in the second response is identical to the second identity contained in the request signal.

16. The method according to claim 13, wherein the control module further causes to broadcast the first response after expiry of the guard period time after receipt of the request signal.

17. A method, comprising:

controlling a transceiver which is enabled to communicate using at least two specific transmission resources, wherein a first of said resources is intended for a device-to-device communication, detecting a request signal received via the first resource, the request signal triggering initiation of a device-to-device communication;

verifying that the request signal contains a second identity which identifies a device associated to the apparatus, detecting a first response received via the first resource and containing a first identity which identifies another device, confirming that the first identity contained in the first response is identical to the second identity contained in the request signal, responsive thereto, causing the transceiver to broadcast a second response containing the second identity, and preparing to start a device-to-device communication via the first resource between the devices having the first and second identities.

* * * * *